United States Patent
Nogaki (10) Patent No.: US 6,954,503 B1
(45) Date of Patent: Oct. 11, 2005

(54) VIDEO IMAGE CODING APPARATUS WITH INDIVIDUAL COMPRESSION ENCODING SECTIONS FOR DIFFERENT IMAGE DIVISIONS

(75) Inventor: Satoshi Nogaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/516,139

(22) Filed: Mar. 1, 2000

(30) Foreign Application Priority Data

Mar. 1, 1999 (JP) .................................. 11-052398

(51) Int. Cl.[7] ............................................. H04N 7/12
(52) U.S. Cl. ............................................. 375/240.26
(58) Field of Search ...................... 375/240.01, 240.02, 375/240.04, 240.03, 240.05, 240.07, 240.08, 375/240.1, 240.2, 240.24, 240.26; H04N 7/12; 382/232, 234, 239, 243, 250, 251

(56) References Cited

U.S. PATENT DOCUMENTS

| | | | | |
|---|---|---|---|---|
| 5,231,484 A | * | 7/1993 | Gonzales et al. | 375/240.04 |
| 5,374,958 A | * | 12/1994 | Yanagihara | 375/240.04 |
| 5,426,463 A | * | 6/1995 | Reininger et al. | 375/240.03 |
| 5,606,371 A | * | 2/1997 | Klein Gunnewiek et al. | 375/240.03 |

FOREIGN PATENT DOCUMENTS

| | | |
|---|---|---|
| JP | 3-267877 | 11/1991 |
| JP | 5-304663 | 11/1993 |
| JP | 6-113274 | 4/1994 |
| JP | 6-217284 | 8/1994 |
| JP | 7-303252 | 11/1995 |
| JP | 8-18955 | 1/1996 |
| JP | 9-294262 | 11/1997 |

* cited by examiner

Primary Examiner—Young Lee
(74) Attorney, Agent, or Firm—Scully, Scott, Murphy & Presser (57) ABSTRACT

A video image coding apparatus which realizes appropriate allocation of an information amount to individual image divisions to reduce the difference in picture quality among different divisions of a decoded image. An input video image signal is into a plurality of image divisions by an image dividing section, and the image divisions are compressed coded by a plurality of coding sections. Resulting compression encoded data are multiplexed by a multiplexing section re-construct compression encoded data, and the compression encoded data are outputted as a compression stream. A coordinated coding control section receives some or all of coding parameters, image status parameters and coding result parameters of the coding sections and adjusts the parameters to be used for compression encoding by the coding sections in a control period or under a control condition determined in advance.

9 Claims, 6 Drawing Sheets

VIDEO IMAGE CODING APPARATUS WITH INDIVIDUAL COMPRESSION ENCODING SECTIONS FOR DIFFERENT IMAGE DIVISIONS

BACKGROUND OF THE INVENTION

1. Field of the Invention

The present invention relates to a video image coding apparatus for compression encoding a video image, and more particularly to a video image coding apparatus wherein an input image is divided into image divisions and the image divisions are parallelly coded.

2. Description of the Related Art

A video image coding apparatus has made rapid progress particularly in recent years. For example, development of image communication and digital broadcasting which adopt the ISO/IEC13818-2 (MPEG-2 VIDEO) is proceeding at present. For coding of such a standard television signal as is prescribed in the ITU-R.601, a particularly high processing speed is not required, and therefore, an apparatus for the coding can be implemented using a single encoder even with a circuit technique and an LSI technique at present.

However, it is difficult to implement an apparatus for encoding such a video image of a high resolution as a video image of a high definition television (HDTV) broadcast using a single encoder with the circuit technique and the LSI technique at present. In order to solve this problem, it is a common technique to divide an input image signal and parallelly process resulting image division signals with a plurality of encoders. Where the technique just described is adopted, if the encoders are controlled so as to operate equivalently to a single encoder by taking such a method that information is always interchanged between the encoders, then this makes the apparatus and circuit control much complicated and is not practical.

Therefore, it is a method normally taken to control the encoders to perform a coding operation in synchronism with a frame or field period or to control the encoders to operate basically independently of each other. For example, a system wherein coding control is performed independently for each of divided portions of a screen is disclosed in Japanese Patent Laid-Open No. Hei 5-304663 entitled "Image Coding Apparatus".

However, a property of a video image as represented by a spatial complexity or a magnitude of a movement of an input video image is usually different among different portions of the image. The difference in property of a video image appears as a difference in amount of generated codes or difficulty in coding.

Accordingly, if an allocation information amount which depends upon the bit rate is simply divided equally and is allocated to and encoded by a plurality of encoders which operate independently of each other, then this gives rise to a problem that appropriate information amounts are not allocated to the encoders and a difference in picture quality appears among different divisions of a decoded image. In the worst case, a partial rupture in picture quality or a trouble of a buffer arises.

Further, according to the system disclosed in Japanese Patent Laid-Open No. Hei 5-304663, only when the generated information amount at a certain image division exceeds a threshold value, the quantization characteristic of adjacent image divisions is simply made rough to reduce the picture quality difference of a decoded image. Accordingly, the system described has a problem that appropriate allocation of the information amount of an entire image or efficient utilization of information by providing a comparatively greater amount of information to a portion which requires a comparatively great amount of information but reducing the amount of information at a portion which does not require a great amount of information is not realized.

SUMMARY OF THE INVENTION

It is an object of the present invention to provide a video image coding apparatus which realizes appropriate allocation of an information amount to individual image divisions to reduce the difference in picture quality among different divisions of a decoded image.

In order to attain the object described above, according to the present invention, there is provided a video image coding apparatus, comprising image dividing means for dividing an input video image signal into a plurality of image divisions, a plurality of coding sections for individually compression encoding the plurality of image divisions outputted from the image dividing means, multiplexing means for multiplexing the plurality of compression encoded data from the coding sections to re-construct compression encoded data and outputting the compression encoded data as a compression bit stream, and coordinated coding control means for receiving some or all of coding parameters, image status parameters and coding result parameters of the coding sections and adjusting the parameters to be used for compression encoding by the coding sections in a control period or under a control condition determined in advance.

The coordinated coding control means may control information amounts to be allocated to the coding sections. Preferably, the coordinated coding control means provides an upper limit value and/or a lower limit value to the information amounts to be allocated to the coding sections.

Alternatively, the coordinated coding control means may control buffer amounts to be allocated to the coding sections. Preferably, the coordinated coding control means provides an upper limit value and/or a lower limit value to the buffer amounts to be allocated to the coding sections.

The video image coding apparatus may be constructed such that it further comprise means for recording the coding parameters and/or the image status parameters of those image portions whose coding has been completed by the coding sections, and the coordinated coding control means performs coding control so that the coding parameters of those image portions which are to be coded subsequently by the coding sections may be proximate to the coding parameters of adjacent image portions.

In this instance, the coordinated coding control means may use, for the coding control, the coding parameters and the image status parameters of those image portions of the same frame or field image whose coding has been completed already.

Alternatively, the coordinated coding control means uses, for the coding control, the coding parameters and the image status parameters of a frame or field image in the past and of the same frame or field image. In this instance, the coordinated coding control means may perform the coding control since a time at which coding of an image of an object of processing at present is started using the coding parameters and the image status parameters of a frame or field image in the past.

In the video image coding apparatus, an input image is divided into image divisions by the image dividing means, and the image divisions are processed parallelly by the plurality of coding sections. Further, the coordinated coding control means provided for the in-division (division local)

coding control sections receives some or all of coding parameters, image status parameters and coding result parameters from the coding sections and adjusts those parameters to be used for coding control of the coding sections in a fixed control period or under a fixed control condition. Consequently, appropriate distribution of an information amount and appropriate buffer management can be realized, and uniformity in picture quality of a decoded image and a normal operation of a buffer can be assured.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

First Embodiment

Figure 1:
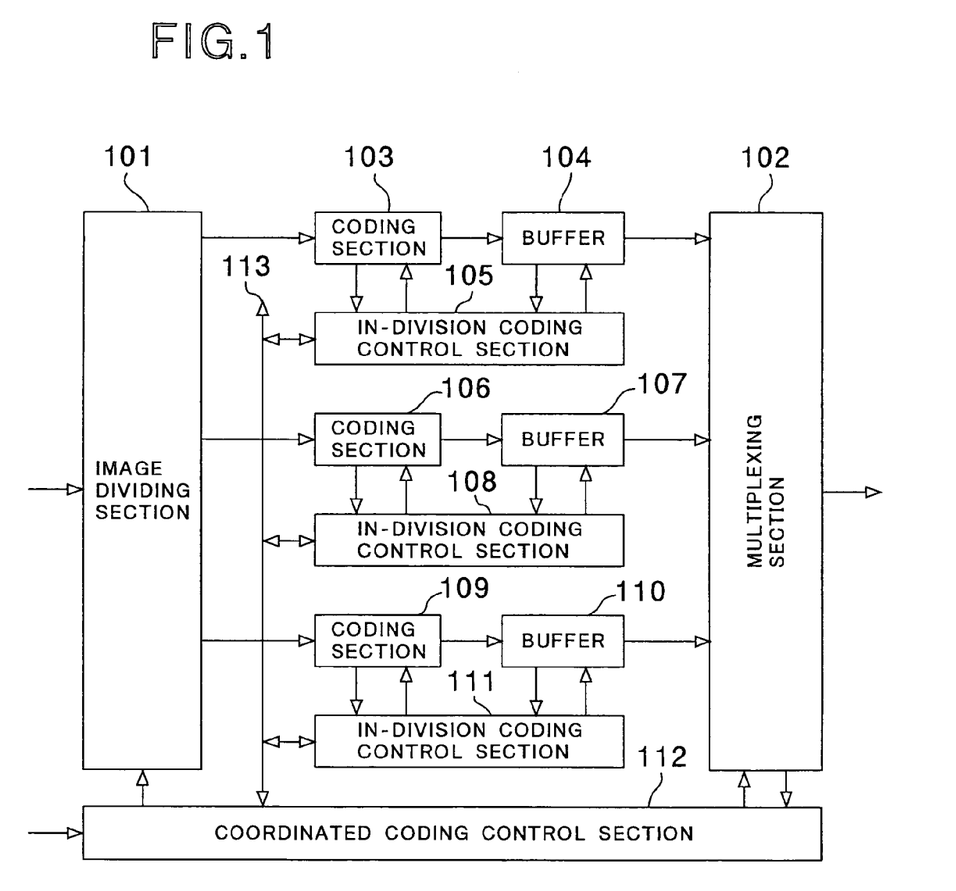
FIG. 1 is a block diagram showing a video image coding apparatus to which the present invention is applied.

Referring first to FIG. 1, there is shown a video image coding apparatus to which the present invention is applied. The present video image coding apparatus includes an image dividing section 101 for dividing an input image and outputting resulting image divisions, a plurality of coding sections 103, 106 and 109 for individually coding the image divisions outputted from the image dividing section 101, a plurality of buffers 104, 107 and 110 for storing output streams of the coding sections 103, 106 and 109, respectively, a plurality of in-division coding control sections 105, 108 and 111 for controlling coding of the coding sections 103, 106 and 109, respectively, and a multiplexing section 102 for multiplexing the image division bit streams outputted from the buffers 104, 107 and 110 into a final stream and outputting the final stream. Further, a coordinated coding control section 112 is connected to the in-division coding control sections 105, 108 and 111 over a communication bus 113.

In operation, the image dividing section 101 divides a video image signal inputted thereto into a predetermined number of image divisions and supplies the image divisions to the coding sections 103, 106 and 109. In this instance, in order to divide, for example, such a video image signal as of an image shown in FIG. 2(A), such an image dividing method as seen, for example, from any of FIGS. 2(B), 2(C) and 2(D) may used.

The coding sections 103, 106 and 109 perform compression encoding of the image divisions supplied thereto in accordance with a predetermined coding method and supplies resulting codes to the buffers 104, 107 and 110, respectively. The coding method may be, for example, the ISO/IEC13818-2 (MPEG-2VIDEO) or the like. In this instance, the coding sections 103, 106 and 109 execute their coding in accordance with coding control parameters such as quantization parameters supplied thereto from the in-division coding control sections 105, 108 and 111, respectively. Further, the coding sections 103, 106 and 109 detect or calculate image status parameters such as complexity parameters of the inputted image, code status parameters used for coding such as quantization parameters, coding result parameters of an object of coding such as a generated information amount, and other necessary parameters and supplies the parameters to the in-division coding control sections 105, 108 and 111, respectively.

The buffers 104, 107 and 110 store the streams supplied thereto and supply them to the multiplexing section 102 at a predetermined appropriate timing. Thereupon, the buffers 104, 107 and 110 execute modification to use amounts of the buffers 104, 107 and 110, which are upper limit amounts permitted for the buffers to use, and so forth in accordance with the coding control parameters supplied thereto from the in-division coding control sections 105, 108 and 111, respectively. Further, the buffers 104, 107 and 110 supply buffer occupation amounts thereof at present and so forth as coding status parameters to the in-division coding control sections 105, 108 and 111, respectively.

The in-division coding control sections 105, 108 and 111 perform coding control based on the image status parameters, coding status parameters, coding result parameters and so forth supplied thereto to produce appropriate coding control parameters and supply the coding control parameters to the coding sections 103, 106 and 109 and the buffers 104, 107 and 110, respectively. Further, the in-division coding control sections 105, 108 and 111 communicate the parameters and so forth supplied thereto from the coding sections 103, 106 and 109 and the buffers 104, 107 and 110 with the coordinated coding control section 112 over the communication bus 113. For the coding control method, a method of adjusting a quantization parameter based on a buffer occupation amount using feedback control is employed usually. It is to be noted that, in the coding control, the in-division coding control sections 105, 108 and 111 may operate basically independently of each other for a time until updating of the coding control parameters is performed from the coordinated coding control section 112, and may operate equivalently to a coding control circuit of an ordinary architecture.

The coordinated coding control section 112 has a function of determining basic coding control parameters based on parameters such as a bit rate and an image size, which are supplied from a user, an apparatus controller or the like and determine entire coding operation, and supplying the determined basic coding control parameters to the image dividing section 101, the in-division coding control sections 105, 108 and 111 and the multiplexing section 102. The coordinated coding control section 112 has another function of evaluating coding situations of the individual image divisions with various parameters supplied thereto over the communication bus 113, calculating coding control parameters such as appropriate information amounts and buffer amount allocations and supplying the calculated coding control parameters over the communication bus 113. The method of calculating the coding control parameters may proportionally distribute the information amount and the buffer amount, for example, in accordance with degrees of complexity of individual image divisions such that a comparatively great amount of information may be allocated to a comparatively complex image division. Further, the coding control parameters may be updated in a predetermined period. The period, however, may alternatively be varied adaptively. Further, it is possible for the coordinated coding control section 112 to have an additional function of supervising the states of all of the buffers supplied thereto from the multiplexing section 102, performing such processing as urgent stopping of coding and reflecting this on the coding control parameters.

The communication bus 113 interconnects the coordinated coding control section 112 and the in-division coding control sections 105, 108 and 111 and is used to communicate various parameters necessary for coding control thereover. While the communication bus 113 here is formed, for example, as a shared bus connection, it may alternatively have some other communication configuration such as a serial connection or a star connection.

The multiplexing section 102 couples the image division streams supplied thereto from the buffers 104, 107 and 110 to reconstruct a stream of an entire image and outputs the stream of the entire image. If a necessary bit rate is not met in a fixed bit rate operation, then stuffing may be performed by the multiplexing section 102. The multiplexing section 102 further has a function of supplying the occupation amount of a buffer for storing the stream after the coupling, a situation of the stuffing and so forth to the coordinated coding control section 112. The object of the present invention described hereinabove can be achieved by the architecture and operation of the video image coding apparatus described above.

Second Embodiment

Figure 4:
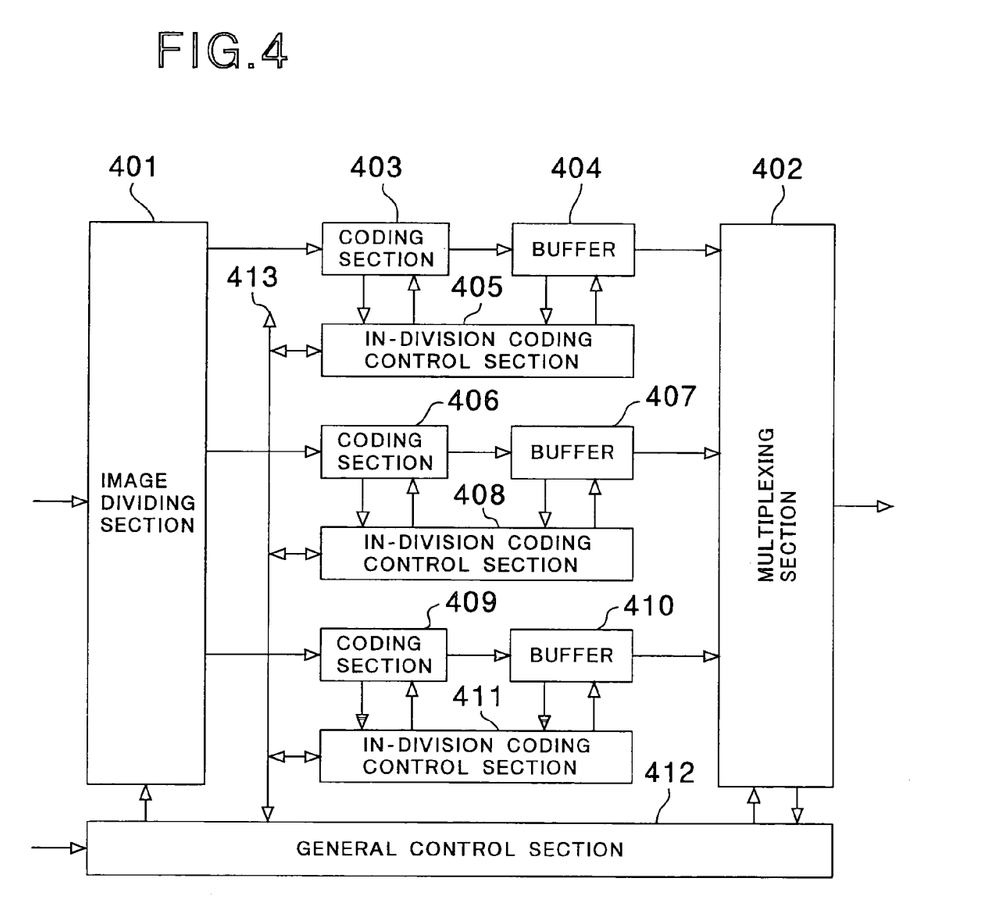
FIG. 4 is a block diagram showing another video image coding apparatus to which the present invention is applied.

FIG. 4 shows another video image coding apparatus to which the present invention is applied. The video image coding apparatus of the present embodiment includes an image dividing section 401, a plurality of coding sections 403, 406 and 409, a plurality of buffers 404, 407 and 410, a plurality of in-division coding control sections 405, 408 and 411, a multiplexing section 402 and a communication bus 413 which are similar to the image dividing section 101, coding sections 103, 106 and 109, buffers 104, 107 and 110, in-division coding control sections 105, 108 and 111, multiplexing section 102 and communication bus 113 of the video image coding apparatus of the first embodiment described hereinabove with reference to FIG. 1, respectively. The video image coding apparatus of the present embodiment further includes a general control section 412 in place of the coordinated coding control section 112.

The video image coding apparatus of the second embodiment shown in FIG. 4 is similar in basic architecture to but is different from the video image coding apparatus of the first embodiment described hereinabove with reference to FIG. 1 in that the coordinated coding control function, which the coordinated coding control section 112 in the video image coding apparatus of the first embodiment of FIG. 1 has, is incorporated in the in-division coding control sections 405, 408 and 411. In particular, in the video image coding apparatus of the first embodiment, parameters to be used for coding are collectively inputted to the coordinated coding control section (112 in FIG. 1), by which calculation for coordinated coding control is performed based on the parameters, and results of the calculation are transferred back to the image division coding control sections. In the video image coding apparatus of the present embodiment, however, various parameter information from the general control section 412 and the in-division coding control sections 405, 408 and 111 is outputted to the communication bus 413, and the in-division coding control sections 405, 408 and 411 may individually read parameters respectively required thereby and perform calculation for coordinated cording control.

Accordingly, in the video image coding apparatus of the present embodiment, the general control section 412 is equivalent to the coordinated coding control section 112 of FIG. 1 which does not have the coordinated coding control function. Consequently, the general control section 412 principally has a function of setting basic coding control parameters based on parameters such as a bit rate, an image size and so forth, which are supplied thereto from a user, an apparatus controller or the like and determine an entire coding operation, and supplying the set basic coding control parameters to the image dividing section 401, in-division coding control sections 405, 408 and 411 and multiplexing section 402.

Since the present video image coding apparatus has such an architecture as described above, the object of the present invention is achieved, and besides, parameter information used for coding need not be communicated between the general control section 412 and the in-division coding control sections 405, 408 and 511. Consequently, also an advantage that an overhead in communication can be reduced is achieved.

Third Embodiment

Figure 5:
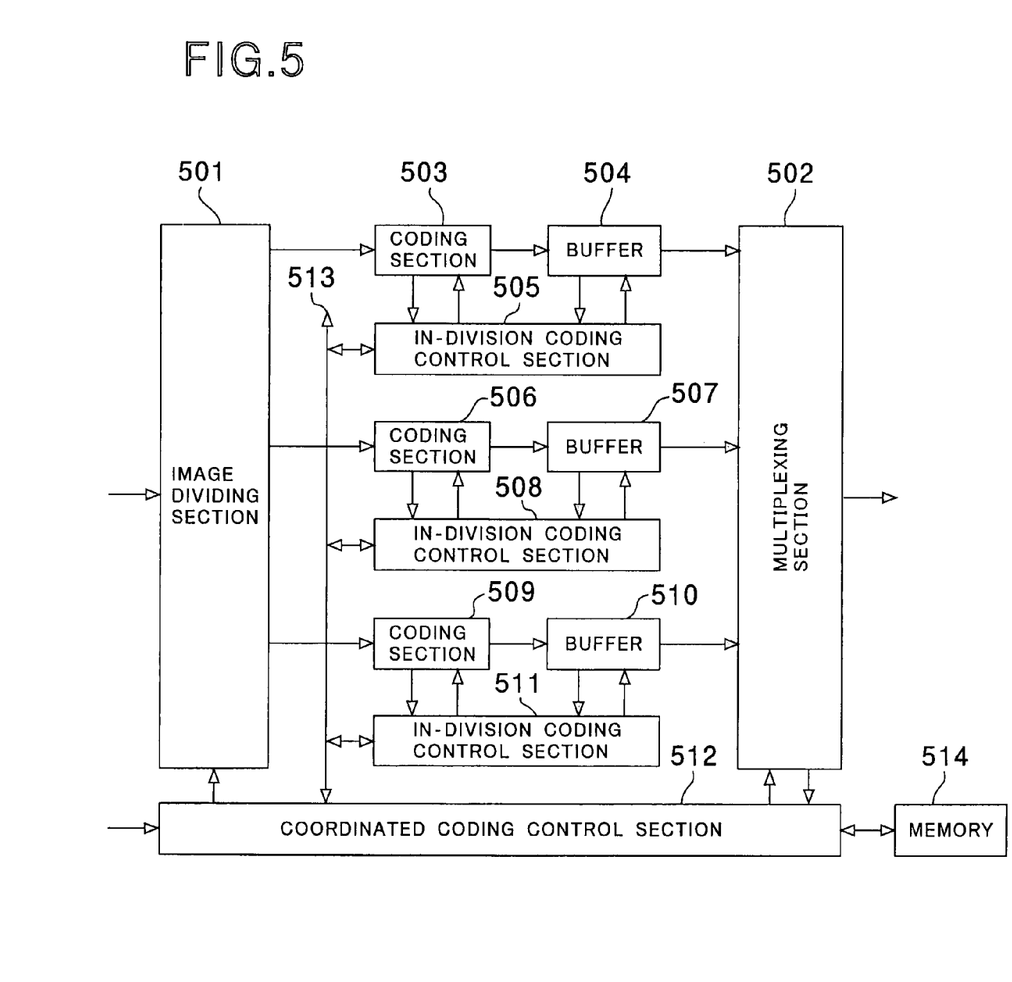
FIG. 5 is a block diagram showing a further video image coding apparatus to which the present invention is applied.

FIG. 5 shows a further video image coding apparatus to which the present invention is applied. The video image coding apparatus of the present embodiment includes an image dividing section 501, a plurality of coding sections 503, 506 and 509, a plurality of buffers 504, 507 and 510, a plurality of in-division coding control sections 505, 508 and 511, a multiplexing section 502, a coordinated coding control section 512 and a communication bus 513 which are similar to the image dividing section 101, coding sections 103, 106 and 109, buffers 104, 107 and 110, in-division coding control sections 105, 108 and 111, multiplexing section 102, coordinated coding control section 112 and communication bus 113 of the video image coding apparatus of the first embodiment described hereinabove with reference to FIG. 1, respectively. The video image coding apparatus of the present embodiment additionally includes a memory 514 for storing various parameters.

More particularly, the memory 514 stores various parameter information of a frame or frames or a field or fields in the past and various parameter information of a frame or a field being encoded at present. The parameter information stored in the memory 514 is referred to upon calculation for coordinated control or is transferred, if necessary, to the in-division coding control sections 505, 508 and 511 so that such control as to make resulting parameters of coding such as quantization parameters at or around boundary portions of image divisions uniform can be performed. Consequently, an effect of uniformity of the picture quality at or around boundary portions of a decoded image is obtained.

Meanwhile, with regard to the video image coding apparatus of the second embodiment described hereinabove with reference to FIG. 4, a similar effect of uniformity of the picture quality of a decoded image at or around boundary portions of image divisions can be obtained if a memory function is additionally provided to the in-division coding control sections 405, 408 and 411.

In the following, means to solve the subject of the present invention is specifically described with reference to FIG. 1. The present video image coding apparatus shown in FIG. 1 is of the type wherein an input image is divided into image divisions and the image divisions are processed parallely by the plurality of coding sections 103, 106 and 109 and is characterized in that it comprises, for the in-division coding control sections 105, 108 and 111, the coordinated coding control section 112 for receiving some or all of coding parameters from the coding sections 103, 106 and 109, image status parameters and coding result parameters and adjusting those parameters to be used for coding control of the coding sections 103, 106 and 109 in a fixed control period or under fixed control conditions.

The coordinated coding control section 112 receives some or all of coding parameters from the coding sections 103, 106 and 109, image status parameters and coding result parameters over the communication bus 113. The coding parameters may include, as an example, a quantization matrix or quantization parameters. The image status parameters may be complexity degrees or movement amounts of an image. Further, the coding result parameters may be a generated information amount or a buffer occupation amount. The coordinated coding control section 112 operates based on the parameters to detect properties or coding situations of image divisions, determine appropriate information amount allocations and appropriately adjust parameters to be used for coding control by the in-division coding control sections 105, 108 and 111. The parameters may be, for example, information amount allocations or buffer amount allocations.

Figure 2A:
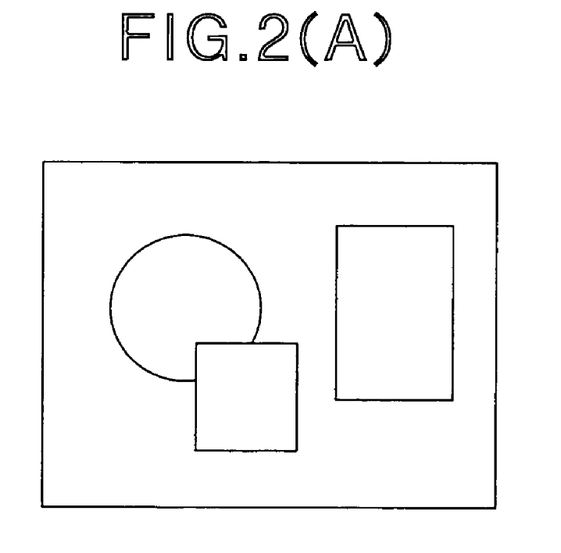
FIGS. 2(A) to 2(D) are schematic views illustrating different examples of a procedure of dividing an input video image.
Figure 2B:
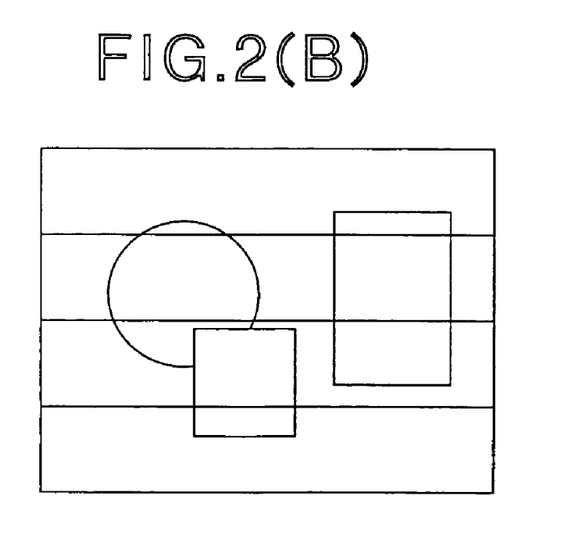
Figure 2C:
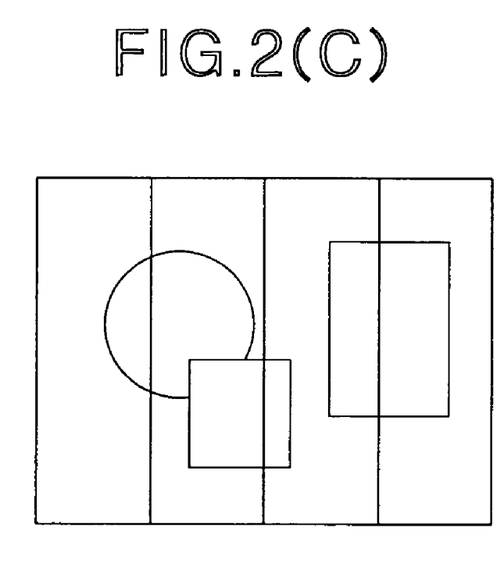
Figure 2D:
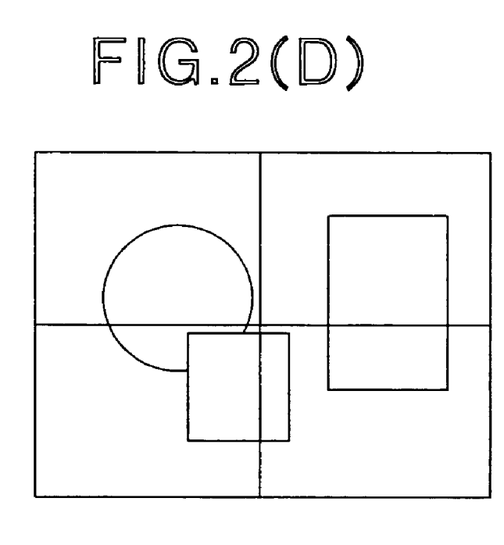

An example of the adjustment operation of parameters by the coordinated coding control section 112 is described below with reference to FIGS. 2(A) to 2(D) and 3. If an image signal of such an image as illustrated in FIG. 2(A) is inputted, then such dividing methods as illustrated, for example, in FIGS. 2(B), 2(C) and 2(D) are available as a method of dividing the image and parallely encoding image divisions obtained by the division. in each of the methods illustrated, the image is divided into four divisions. In each of the methods, imaging objects included in the image divisions are different from one another, and when the image divisions are parallely coded by the coding sections, also generation patterns of the information amount are quite different from one another.

Figure 3A:
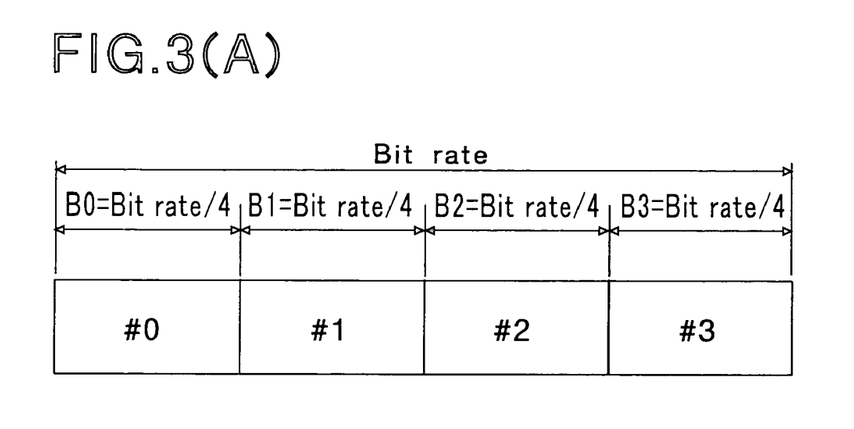
FIGS. 3(A) and 3(B) are diagrammatic views illustrating different examples of information amount distribution and illustrating a principle of operation of the video image coding apparatus of FIG. 1.
Figure 3B:
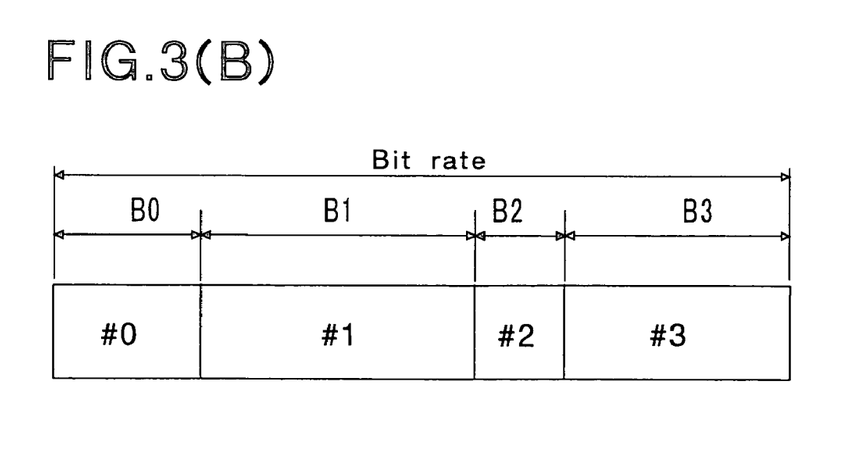

If such a method as illustrated in FIG. 3(A) wherein the bit rate of a transmission line or a recording medium is allocated uniformly and divisionally to such image divisions as described above is employed, then the picture quality of a decoded image is much different among the different image divisions. Therefore, if the bit rate is distributed based on the properties of the image divisions in such a manner as seen from FIG. 3(B), then the difference of the picture quality of the decoded image among the different image divisions can be reduced. While an example of allocation of the information amount based on the bit rate is described above, also it is possible to distribute the buffer amount similarly. Where such methods are employed, coding control of the coding sections 103, 106 and 109 can be carried out more appropriately.

However, if an extremely high value or an extremely low value is allocated in such distribution of the information amount or the buffer amount, then the coding control may not possibly operate regularly, but control rupture or control oscillation may occur. Therefore, in the present invention, the problem just described is solved by providing an upper limit value and a lower limit value to the distribution of the information amount and the distribution of the buffer amount.

Further, where adjusted parameters are supplied from the coordinated coding control section 112, it may possibly occur that, although the coding situations in image divisions are preferable on the average, the picture quality exhibits discontinuity at the boundary between image divisions. This problem is described below. For in-division coding control, feedback control from a buffer is used popularly. Therefore, the coding result parameter is frequently different among different positions even in an image division. Accordingly, where an imaging object extends over a plurality of image divisions as seen in FIG. 2(B), 2(C) or 2(D), even if an image object is continuous, the coding result parameter is sometimes different between the image divisions over which the image object extends, and this makes the picture quality of a decoded image discontinuous. Therefore, in the present invention, this problem is solved by recording coding result parameters and so forth of image divisions encoded already and so forth and causing the in-division coding control to operate so that the coding situations of boundary portions may be uniform.

In this manner, the embodiments described above are directed to a video image coding apparatus for dividing an input video image and parallely processing resulting image divisions by means of a plurality of coding sections, by which appropriate allocation of an information amount among different image divisions is realized, the difference in picture quality among different image divisions of a decoded image is minimized and a normal buffer condition is realized. In order to achieve this object, the encoding sections perform coding control basically independently of each other, and while a high degree of facility in apparatus implementation is kept, appropriate coding control in accordance with a property of an image or a coding situation is allowed. As a result, augmentation of the picture quality of a decoded image, augmentation of the coding efficiency and assurance of a normal operation of a buffer are realized.

While preferred embodiments of the present invention have been described using specific terms, such description is for illustrative purposes only, and it is to be understood that changes and variations may be made without departing from the spirit or scope of the following claims.

What is claimed is:

1. A video image coding apparatus, comprising:
   image dividing means for dividing an input video image signal into a plurality of image divisions;
   a plurality of coding sections for individually compression encoding the plurality of image divisions outputted from said image dividing means;
   multiplexing means for multiplexing the plurality of compression encoded data from said coding sections to reconstruct compression encoded data and outputting the compression encoded data as a compression stream; and
   coordinated coding control means for receiving some or all of coding parameters, image status parameters and coding result parameters which are extracted from said plurality of coding sections, adjusting the parameters to be used for compression encoding by said coding sections in a control period or under a control condition determined in advance, and supplying the parameters to said plurality of coding sections in order to achieve coordinated coding between the coding sections;
   wherein said coordinated coding control means determines basic coding control parameters based on parameters such as a bit rate and an image size, and supplies the determined basic coding control parameters to said image dividing means, said plurality of coding sections and said multiplexing means; and wherein said coordinated coding control means evaluates coding situations of said plurality of image divisions with parameters supplied thereto over a communication bus, calculates coding control parameters and supplies the calculated coding control parameters over said communication bus.

2. A video image coding apparatus as claimed in claim 1, wherein said coordinated coding control means controls information amounts to be allocated to said coding sections.

3. A video image coding apparatus as claimed in claim 2, wherein said coordinated coding control means provides an upper limit value and/or a lower limit value to the information amounts to be allocated to said coding sections.

4. A video image coding apparatus as claimed in claim 1, wherein said coordinated coding control means controls buffer amounts to be allocated to said coding sections.

5. A video image coding apparatus as claimed in claim 4, wherein said coordinated coding control means provides an upper limit value and/or a lower limit value to the buffer amounts to be allocated to said coding sections.

6. A video image coding apparatus as claimed in claim 1, further comprising means for recording the coding parameters and/or the image status parameters of those image portions whose coding has been completed by said coding sections, and wherein said coordinated coding control means performs coding control so that the coding parameters of those image portions which are to be coded subsequently by said coding sections may be proximate to the coding parameters of adjacent image portions.

7. A video image coding apparatus as claimed in claim 6, wherein said coordinated coding control means uses, for the coding control, the coding parameters and/or the image status parameters of those image portions of the same frame or field image whose coding has been completed already.

8. A video image coding apparatus as claimed in claim 6, wherein said coordinated coding control means uses, for the coding control, the coding parameters and/or the image status parameters of a frame or field image in the past and of the same frame or field image.

9. A video image coding apparatus as claimed in claim 8, wherein said coordinated coding control means performs the coding control since a time at which coding of an image of an object of processing at present is started using the coding parameters and/or the image status parameters of a frame or field image in the past.

\* \* \* \* \*